United States Patent
Kuhl et al.

(10) Patent No.: US 7,860,489 B2
(45) Date of Patent: Dec. 28, 2010

(54) SYSTEM AND METHOD FOR PROVIDING A USER INTERFACE FOR MANAGING CALLS RECEIVED AT A MOBILE DEVICE

(75) Inventors: Lawrence Edward Kuhl, Waterloo (CA); Raymond Paul Vander Veen, Waterloo (CA); Anton Epp, Breslau (CA); Keizo Marui, Waterloo (CA); Leonid Leon Vymenets, Thronhill (CA)

(73) Assignee: Research In Motion Limited, Waterloo, Ontario (CA)

( * ) Notice: Subject to any disclaimer, the term of this patent is extended or adjusted under 35 U.S.C. 154(b) by 622 days.

(21) Appl. No.: 11/691,051

(22) Filed: Mar. 26, 2007

(65) Prior Publication Data
US 2008/0242282 A1    Oct. 2, 2008

(51) Int. Cl.
*H04M 3/42* (2006.01)
(52) U.S. Cl. ........................ 455/415; 455/417
(58) Field of Classification Search ............... 455/415
See application file for complete search history.

(56) References Cited

U.S. PATENT DOCUMENTS

| | | | |
|---|---|---|---|
| 5,367,558 | A | 11/1994 | Gillig et al. |
| 5,448,622 | A | 9/1995 | Huttunen |
| 5,526,403 | A | 6/1996 | Tam |
| 5,815,566 | A | 9/1998 | Ramot et al. |
| 6,154,660 | A | 11/2000 | Singh |
| 6,256,516 | B1 | 7/2001 | Wagner et al. |
| 6,285,364 | B1 | 9/2001 | Giordano et al. |
| 6,289,025 | B1 | 9/2001 | Pang et al. |
| 6,311,055 | B1 | 10/2001 | Boltz |
| 6,366,302 | B1 * | 4/2002 | Crosby et al. ............... 715/786 |

(Continued)

FOREIGN PATENT DOCUMENTS

EP    1 289 234    3/2003

(Continued)

OTHER PUBLICATIONS

European Search and Examination Report. Application No. 07104940.7 Date: Oct. 5, 2007.

(Continued)

*Primary Examiner*—Lester Kincaid
*Assistant Examiner*—Yu (Andy) Gu
(74) *Attorney, Agent, or Firm*—Bereskin & Parr LLP/S.E.N.C.R.L., s.r.l (57) ABSTRACT

Embodiments of a system and method for providing a user interface for managing calls received at a mobile device is described. The user interface provides an incoming call screen to the user, where the incoming call screen comprises a caller identification data field for displaying data associated with incoming calls and at least one key label field in which labels for mobile device keys (e.g. send and end keys) are displayed. The area of the caller identification data field is substantially greater than the area of the at least one key label field, enabling more information pertaining to incoming calls to be displayed to the user. In at least one embodiment, this is facilitated by providing user-selectable options for responding to incoming calls in an options menu, which can be accessed by a user but is not initially displayed to the user when an incoming call is first received.

20 Claims, 9 Drawing Sheets

U.S. PATENT DOCUMENTS

| | | | |
|---|---|---|---|
| 6,515,997 | B1 | 2/2003 | Feltner et al. |
| 6,574,470 | B1* | 6/2003 | Chow et al. .................. 455/417 |
| D479,531 | S | 9/2003 | Yanagida |
| 6,757,372 | B1 | 6/2004 | Dunlap et al. |
| 6,865,625 | B2 | 3/2005 | Davani et al. |
| 7,020,273 | B2 | 3/2006 | Kraft et al. |
| 7,046,994 | B1 | 5/2006 | Padawer et al. |
| 7,092,495 | B2 | 8/2006 | Kraft et al. |
| 7,231,208 | B2 | 6/2007 | Robertson et al. |
| 7,336,260 | B2 | 2/2008 | Martin et al. |
| 2002/0183091 | A1 | 12/2002 | Heo |
| 2003/0190025 | A1* | 10/2003 | Okamura et al. ....... 379/142.17 |
| 2004/0137967 | A1* | 7/2004 | Bodley .................... 455/575.2 |
| 2004/0215845 | A1 | 10/2004 | Davani et al. |
| 2005/0009571 | A1 | 1/2005 | Chiam et al. |
| 2005/0170854 | A1 | 8/2005 | Benco et al. |
| 2006/0205432 | A1* | 9/2006 | Hawkins et al. .......... 455/552.1 |
| 2007/0081641 | A1 | 4/2007 | Veen et al. |
| 2007/0129103 | A1 | 6/2007 | Al-Shaikh |
| 2007/0217132 | A1* | 9/2007 | Collins ....................... 361/681 |
| 2008/0242277 | A1 | 10/2008 | Chen et al. |

FOREIGN PATENT DOCUMENTS

| | | |
|---|---|---|
| EP | 1628460 | 2/2006 |
| EP | 1768360 | 3/2007 |
| WO | WO 94/17639 | 8/1994 |
| WO | 97/35413 | 9/1997 |
| WO | 9821871 | 5/1998 |
| WO | 2006/067541 | 6/2006 |

OTHER PUBLICATIONS

Co-pending U.S. Appl. No. 11/691,187, "System and Method for Providing Calling Feature Icons in a User Interface that Facilitates User Selection of a Communication Line for an Outgoing Call on a Mobile Device", filed Mar. 26, 2007. (Retrievable from PAIR).

Amendment. Co-pending U.S. Appl. No. 11/691,187. Dated: Feb. 3, 2010.

United States Office Action. Co-pending U.S. Appl. No. 11/691,187. Dated: Nov. 6, 2009.

Co-pending U.S. Appl. No. 11/691,172, "System and Method for Providing a User Interface that Facilitates User Selection of a Communication Line for an Outgoing Call on a Mobile Device", filed Mar. 26, 2007. (Retrievable from PAIR).

Amendment. Co-pending U.S. Appl. No. 11/691,172. Dated: Feb. 9, 2010.

United States Office Action. Co-pending U.S. Appl. No. 11/691,172. Dated: Nov. 9, 2009.

Co-pending U.S. Appl. No. 11/235,509, "Method and Apparatus for Line Selection in a Communication Device", filed Sep. 27, 2005. (Retrievable from PAIR).

Response to Rule 312 Communication. Co-pending U.S. Appl. No. 11/235,509. Dated: Dec. 30, 2009.

Amendment After Allowance. Co-pending U.S. Appl. No. 11/235,509. Dated: Dec. 21, 2009.

Notice of Allowance and Fee(s) Due. Co-pending U.S. Appl. No. 11/235,509. Dated: Dec. 7, 2009.

Amendment. Co-pending U.S. Appl. No. 11/235,509. Dated: Sep. 1, 2009.

United States Office Action. Co-pending U.S. Appl. No. 11/235,509. Dated: Jun. 1, 2009.

United States Final Office Action. Co-pending U.S. Appl. No. 11/691,187. Dated: Apr. 12, 2010.

European Examination Report. Application No. 07104940.7. Dated: Jul. 9, 2010.

Final Office Action. Co-pending U.S. Appl. No. 11/691,172. Dated: Apr. 15, 2010.

Request for Continued Examination (RCE). Co-pending U.S. Appl. No. 11/691,172. Dated: Jun. 14, 2010.

Amendmen. Co-pending U.S. Appl. No. 11/691,172. Dated: Jun. 14, 2010.

Request for Continued Examination (RCE). Co-pending U.S. Appl. No. 11/691,187. Dated: Jun. 14, 2010.

Amendmen. Co-pending U.S. Appl. No. 11/691,187. Dated: Jun. 14, 2010.

* cited by examiner

SYSTEM AND METHOD FOR PROVIDING A USER INTERFACE FOR MANAGING CALLS RECEIVED AT A MOBILE DEVICE

TECHNICAL FIELD

Embodiments described herein relate generally to user interfaces provided by mobile device applications, and more specifically to phone-equipped mobile devices that allow calls to be received by users.

BACKGROUND

Many modern mobile devices are multi-functional. They may be configured to allow users to engage in both electronic mail ("e-mail") communications and telephone communications, for example. Additionally, it is common for a user to utilize the mobile device for different purposes. For example, a user may operate a single mobile device to engage in communications relating to both business and personal Uses. Some phone-equipped mobile devices may be adapted to accommodate an Alternate Line Service (ALS) or similar service. With respect to these mobile devices, two (or more) phone numbers may be associated with a mobile device, with each phone number being associated with a different communication line.

Typically, mobile devices are configured to notify users of an incoming call by displaying an incoming call screen in which details of the call and a set of options for response are provided. For example, text data comprising a name and telephone number may be displayed in an upper half of the incoming call screen, while a list of virtual buttons representing user-selectable options (e.g. "Answer Call", "Ignore Call") may be displayed in a lower half of the incoming call screen.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

As mobile devices become more functional, the number of user-selectable options that can be made available to users for managing incoming calls will increase. Providing the user with all available options for responding to a call at the time the call is first received can be difficult to accommodate, particularly in known user interfaces where incoming call details and identifiers for all available options are initially displayed simultaneously within a single incoming call screen. Moreover, the amount of data that can be displayed to a user at any given time is generally constrained by the limited screen area typically available on most mobile devices.

In respect of these known user interfaces, as the number of options to be displayed to a user when a call is first received increases, the remaining area on the incoming call screen for displaying details of the incoming call (e.g. data identifying the caller to the user) would decrease. This may be undesirable, as users will typically want to consider details of the incoming call first in order to determine the user's course of action (e.g. whether to answer the call or not). Receiving more detailed information on the incoming call may be preferable to receiving details on all available options for response, particularly if the user typically only selects a small number of options (e.g. answer call, ignore call) in routine use.

Embodiments described herein are generally directed to a system and method for providing an improved user interface for receiving calls on phone-equipped mobile devices.

In a broad aspect, there is provided a method of providing a user interface for managing calls received at a mobile device, the mobile device providing access to at least a first communication line configured to receive the calls, the mobile device providing send and end keys, the method comprising the steps of: identifying a phone number associated with an incoming call being received at the mobile device; and displaying an incoming call screen on a display to a user of the mobile device, the incoming call screen comprising (i) a caller identification data field for displaying data associated with incoming calls and (ii) at least one key label field in which first and second labels for the send key and end key respectively are displayed; wherein the area of the caller identification data field is substantially greater than the area of the at least one key label field; and wherein an options menu is displayed on the incoming call screen only if a direction to display the options menu is received from the user after the incoming call is first received at the mobile device.

In one embodiment, the method of providing a user interface for managing calls received at a mobile device comprises the steps of: detecting when the user provides the direction to display the options menu, displaying the options menu to the user, detecting when the user selects an option from the options menu, and processing the incoming call in accordance with the user-selected option.

In one embodiment, the method of providing a user interface for managing calls received at a mobile device comprises displaying a wireless audio device icon.

In another embodiment, the method of providing a user interface for managing calls received at a mobile device comprises displaying at least one item of data associated with the incoming call in an area of the caller identification data field that is substantially centered along at least one axis of the display.

In another embodiment, the method of providing a user interface for managing calls received at a mobile device comprises displaying a company name from a contact entry associated with an incoming call in the caller identification data field.

In another embodiment, the method of providing a user interface for managing calls received at a mobile device comprises displaying data identifying the communication line on which a call is received in the caller identification data field.

These and other aspects and features of various embodiments will be described in greater detail below.

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
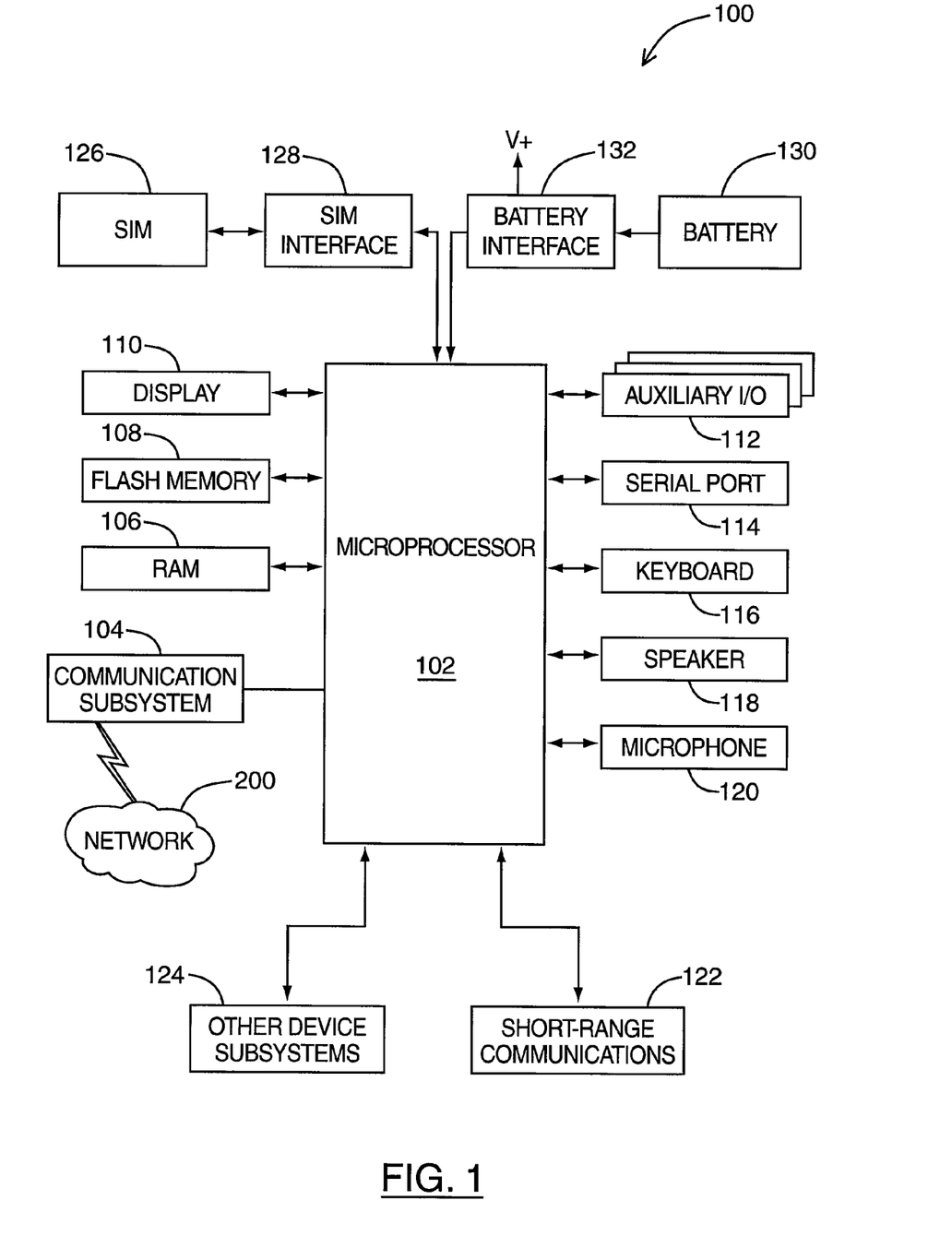
FIG. 1 is a block diagram of a mobile device in one example implementation.
Figure 2:
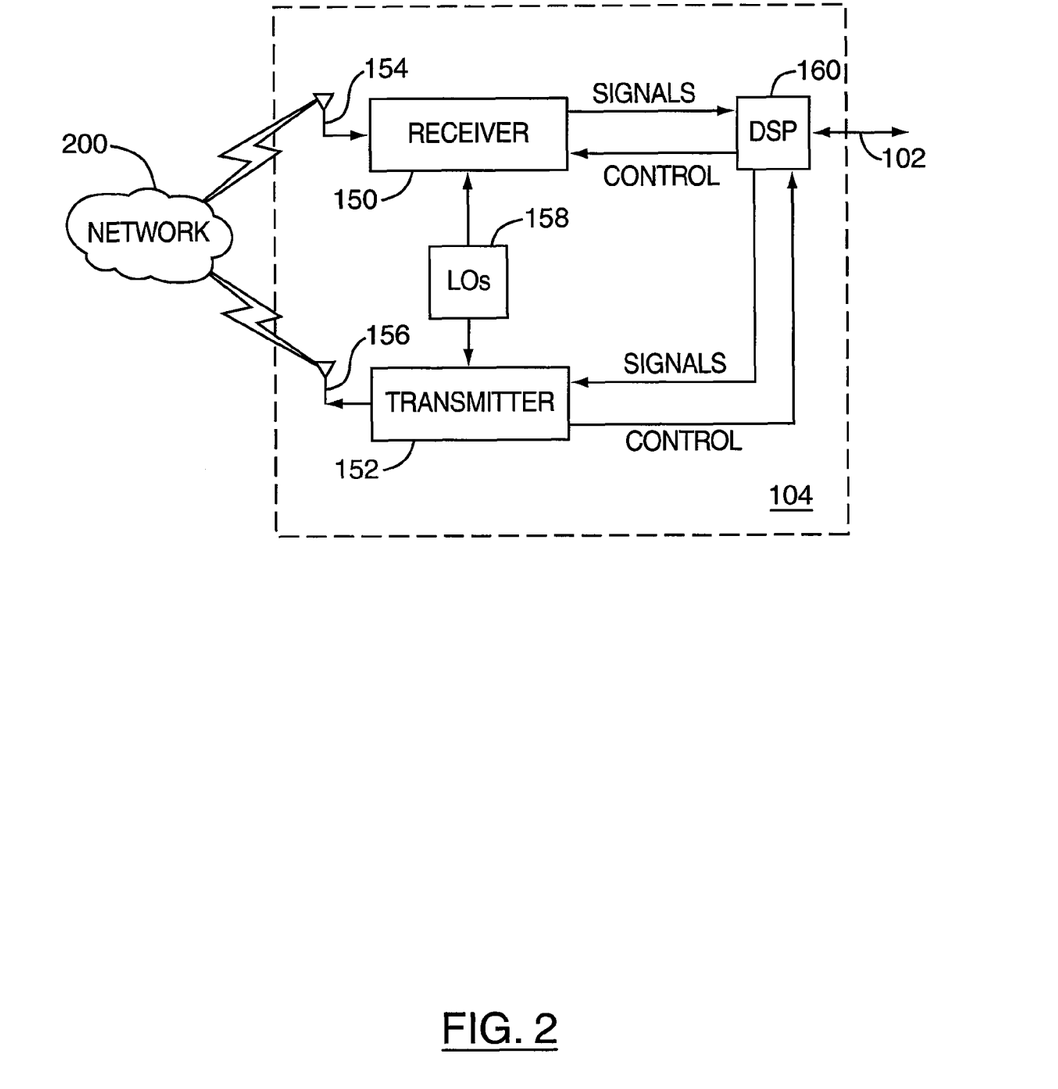
FIG. 2 is a block diagram of a communication subsystem component of the mobile device of FIG. 1.
Figure 3:
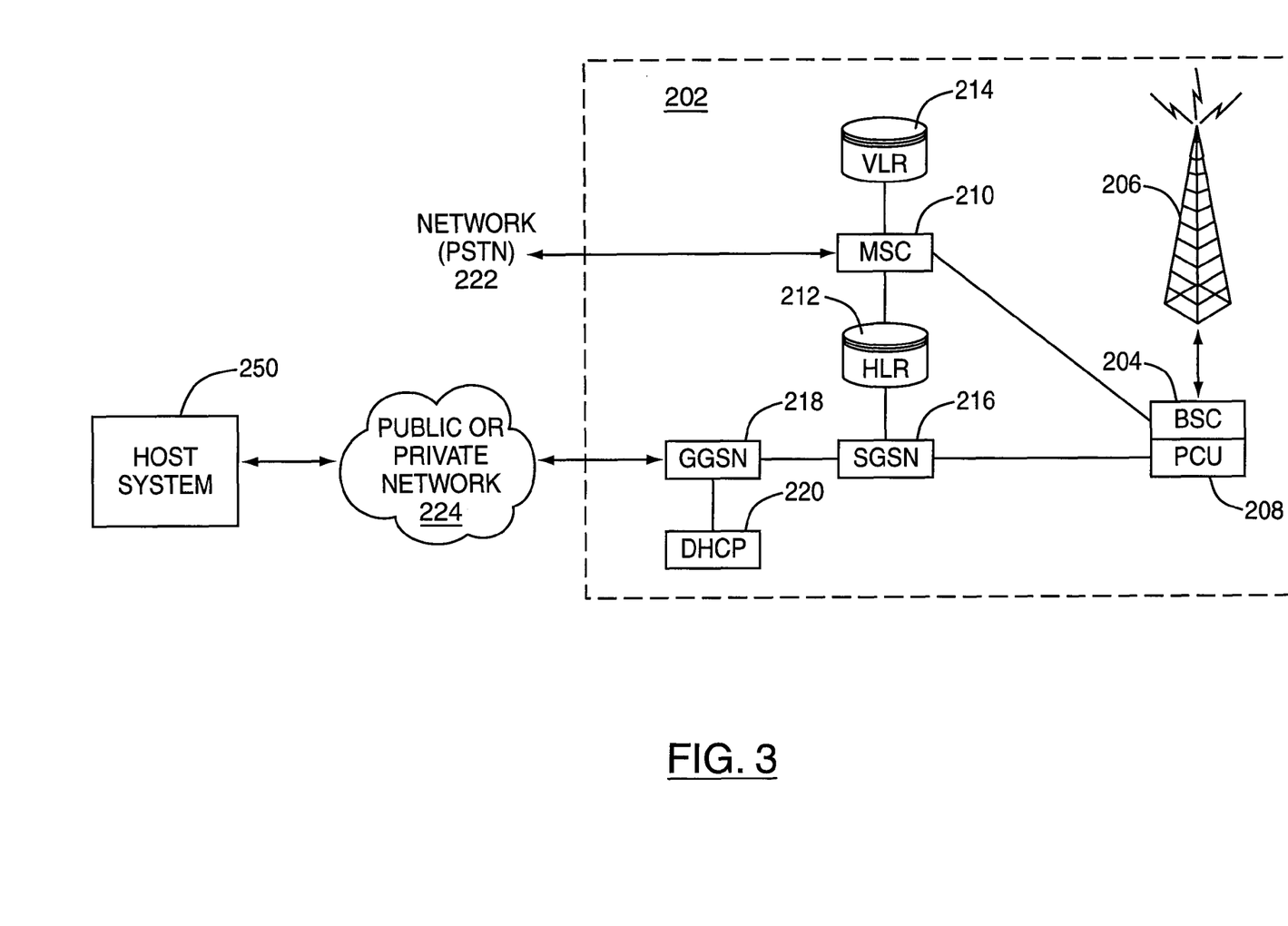
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 1.26 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be de-allocated and the IP address returned to the IP address pool managed by DHCP server 220.

Figure 4:
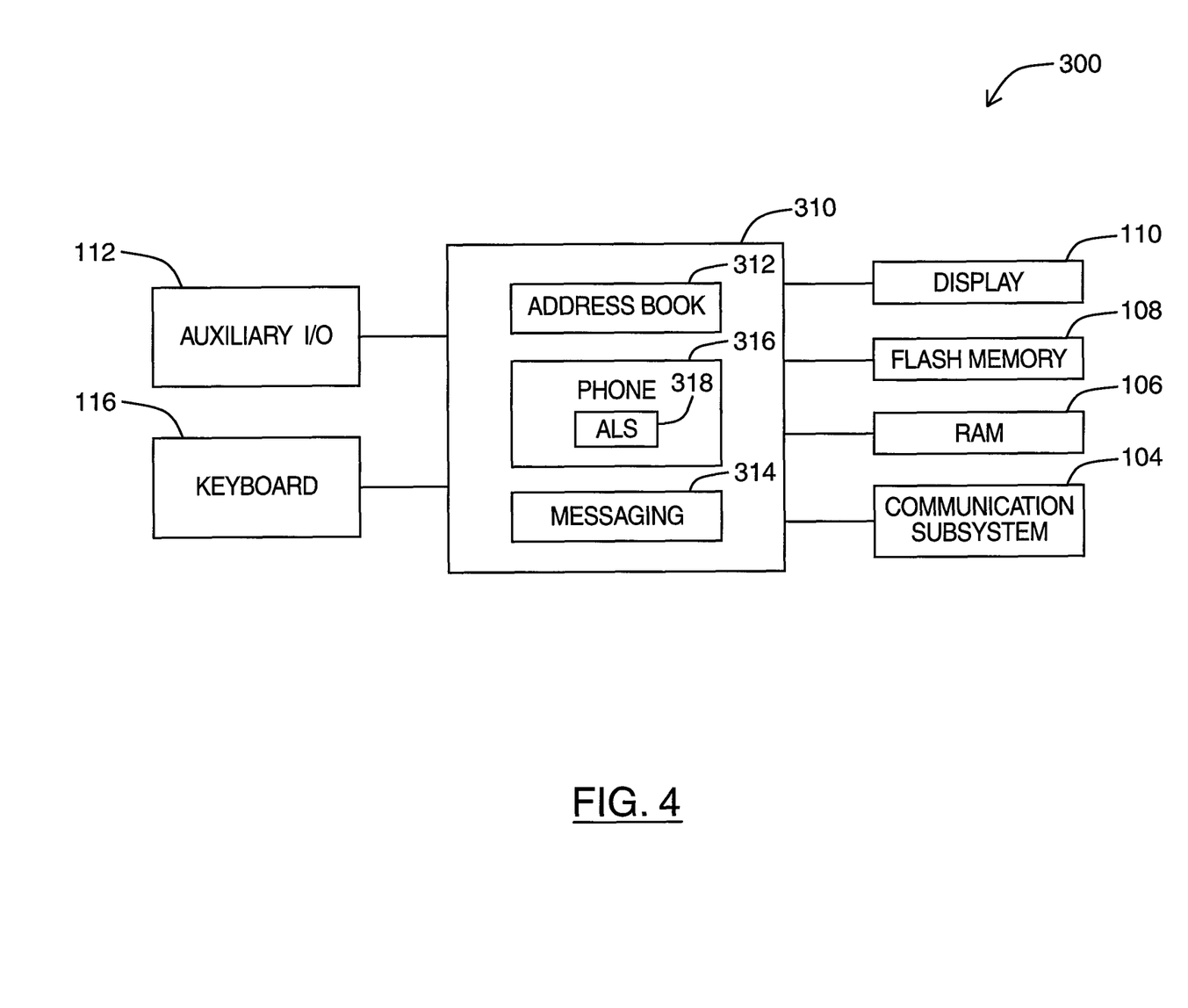
FIG. 4 is a block diagram illustrating further aspects of the mobile device of FIG. 1.

Referring now to FIG. 4, a block diagram illustrating further aspects of mobile device 100 of FIG. 1 is shown generally as 300. As noted earlier with reference to FIG. 1, microprocessor 102, in addition to its operating system functions, enables execution of software applications on mobile device 100. A set of applications that control basic device operations, including data and voice communication applications, will normally be installed on mobile device 100 during its manufacture. Operating system software and other software applications are typically stored in a persistent store (e.g. flash memory 106) or other store, on mobile device 100 or on a device coupled thereto. It will be understood that the operating system, software applications or parts thereof, may be temporarily loaded in a volatile store such as RAM 106. Other instructions and/or data received by the mobile device 100 and subject to processing may also be temporarily stored in RAM 106.

Software applications that are loaded or stored on mobile device 100 may be implemented as functional components or modules 310. Modules 310 interact with various components of mobile device 100. For instance, as shown by way of example in FIG. 4, modules 310 may interact with communication subsystem 104, RAM 106, flash memory 108, display 110, auxiliary I/O device(s) 112, and keyboard 116. Modules 310 may comprise, for example, an address book module 312, a messaging module 314 (e.g. for e-mail and/or SMS or MMS messaging), and a phone application module 316.

Address book (also referred to as "contact book") module 312 is generally configured to allow contact information (e.g. contact entries comprising individual contact and company names, telephone numbers, messaging addresses, pictures and other information) to be stored and managed.

Messaging module 314 facilitates the sending and receiving of electronic messages over a wireless network 200 and/or other network.

Phone application module 316 is generally configured to facilitate voice communication between the user and other parties, including the placement of outgoing calls by the user and the reception of incoming calls on the mobile device 100.

Calls may be placed and received on a communication line specifically configured for voice communications. In certain embodiments, calls may alternatively or additionally be placed and received on other types of communication lines, including a communication line generally configured for data communications, or a communication line configured for both voice and data communications, for example. For example, mobile device 100 may be configured to provide Voice over IP (VoIP) and/or video phone functionality.

Some mobile devices are configured to provide access to multiple (i.e. two or more) communication lines on which incoming calls may be received. Typically, these mobile devices will also be configured to allow outgoing calls to be initiated by the user over the same communication lines. Each of the multiple communication lines may have a different telephone number associated therewith. For example, a user may have a business phone number and a different personal phone number. Referring again to FIG. 4, a line selection module (e.g. alternate line service (ALS) module) 318 is provided to facilitate selection of the communication line to be used by phone application module 316 for placing an outgoing call, for example. The line selection module 318 is configured to select a communication line to be used by phone application module 316, based upon line selection data stored on mobile device 100 (e.g. configuration settings that define a default communication line), and/or based upon input received by the user. It will be understood that the functionality of line selection module 318 may be provided or otherwise integrated with phone application module 316 or with a different module on mobile device 100.

When an incoming call is received at the mobile device, an incoming call screen is typically displayed, in which details of the call and a set of options for response are provided. As users will likely want to consider details of the incoming call first in order to determine the user's course of action (e.g. whether to answer the call or not), it may be desirable to provide more detailed information on the incoming call to a user at the time the call is first received. However, the amount of such caller identification information that may be provided to users is often restricted in known user interfaces, as a substantial portion of the incoming call screen is typically also used to provide details on all the available options for response at the time the call is first received, and the amount of screen area provided by a mobile device is generally limited.

Embodiments described herein are generally directed to a system and method for providing an improved user interface for receiving calls on phone-equipped mobile devices.

More specifically, embodiments described herein relate generally to a user interface that provides an incoming call screen to the user, where the incoming call screen comprises a caller identification data field for displaying data associated with incoming calls and at least one key label field in which labels for mobile device keys (e.g. send and end keys) are displayed.

In one embodiment, the combined areas of the caller identification data field and the at least one key label field substantially occupies the entire visible area of the display of the mobile device.

In example embodiments, the area of the caller identification data field is substantially greater than the area of the at least one key label field, enabling more information pertaining to incoming calls to be displayed to the user when a call is first received at the mobile device.

In accordance with at least one embodiment, this is facilitated by providing user-selectable options for responding to incoming calls in an options menu, which can be accessed by a user but is not initially displayed to the user when an incoming call is first received. The options menu is displayed on the incoming call screen only if a direction to display the options menu is received from the user after the incoming call is first received at the mobile device.

In one embodiment, the options menu is accessible when the user depresses a menu key or other pre-programmed key on the mobile device after the incoming call is first received at the mobile device. An options menu identifier (e.g. "More") may be displayed in a key label field on the display (e.g. near the corresponding menu key or other pre-programmed key, or with an additional identifier that otherwise indicates the corresponding key) to indicate the key that must be pressed by the user to direct that the options menu be displayed.

In one embodiment, labels (e.g. phone icons, text identifiers) are provided over the send and end keys provided on the mobile device as "hints" to indicate the function of these keys. Each of these labels is displayed in a key label field on the display (e.g. near the respective key, or with an additional identifier that otherwise indicates the respective key). Accordingly, virtual buttons to identify the same actions associated with these keys need not be displayed in the caller identification data field when a call is first received at the mobile device.

In one embodiment, a wireless audio device icon is displayed with the label for the send key to indicate that audio signals for the call will be transmitted to an auxiliary audio device rather than to an integrated speaker on the mobile device. The auxiliary audio device may be, for example, a wireless audio device (e.g. a Bluetooth™ headset or earpiece, a remote speaker).

In one embodiment, at least some caller identification data is displayed in an area of the caller identification data field that is substantially centered along at least one axis of the display. For example, certain caller identification data (e.g. name of caller, phone number, picture, and/or company name) can be displayed in an area centered along a vertical axis on the display.

In one embodiment, caller identification data displayed in the caller identification data field comprises data (e.g. company name, picture) from a contact entry associated with an incoming call on the mobile device.

In one embodiment, where the mobile device is configured to provide access to multiple communication lines configured to receive calls, caller identification data displayed in the caller identification data field comprises data identifying the communication line on which a call is received at the mobile device.

Further features of the above-mentioned embodiments and of other embodiments will be apparent from the description that follows and the appended Figures.

Figure 5:
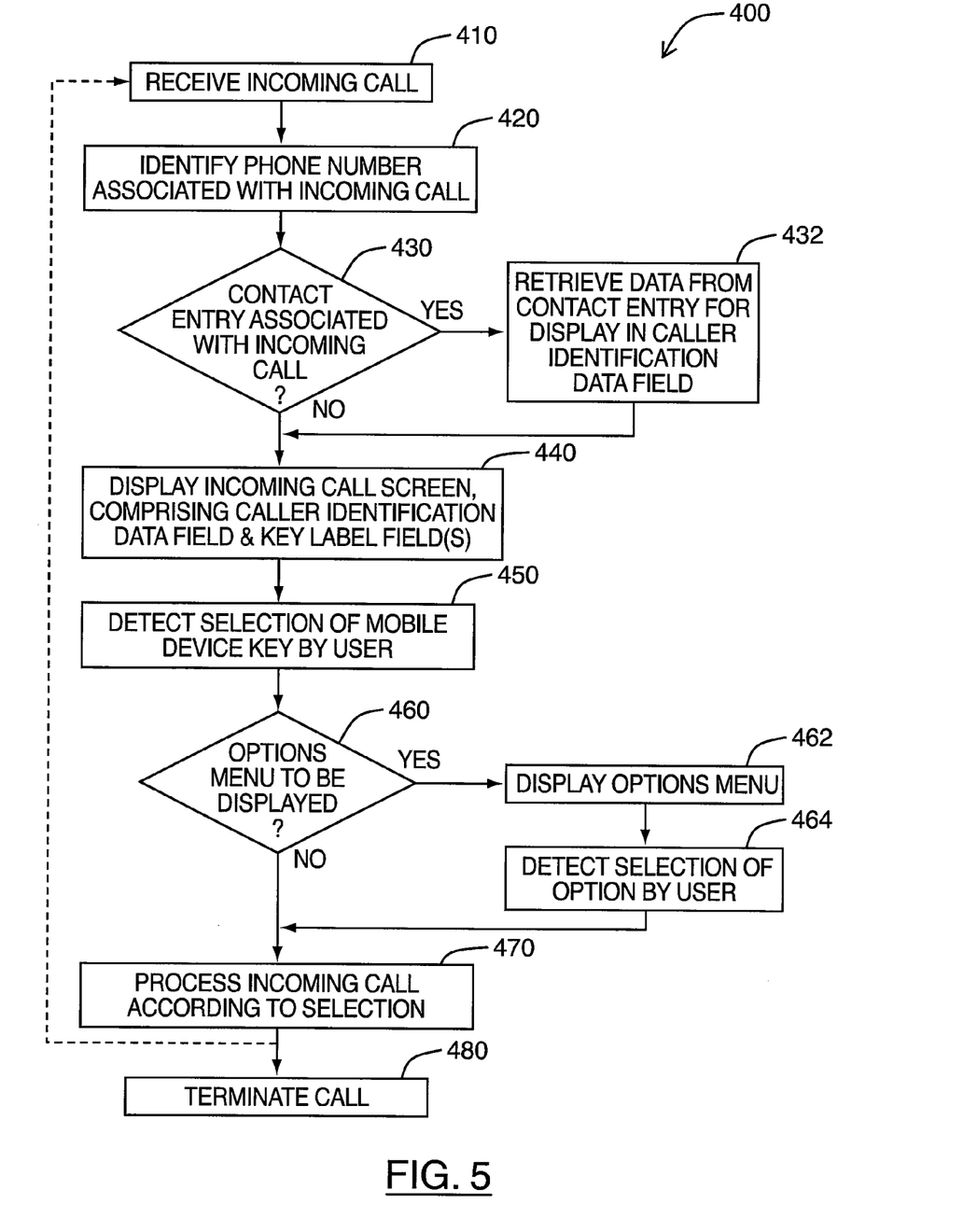
FIG. 5 is a flowchart illustrating steps of a method of providing a user interface for managing calls received at a mobile device in accordance with at least one embodiment.

Referring now to FIG. 5, a flowchart illustrating steps of a method of providing a user interface for managing calls received at a mobile device in accordance with at least one embodiment is shown generally as 400. Additional details of some of the features described below in respect of the steps of method 400 may be described earlier in the present specification.

In one embodiment, the steps of method 400 are performed at the mobile device by an application (e.g. phone application module 316 of FIG. 4) that executes and resides on the mobile device (e.g. mobile device 100 of FIG. 1). The application need not be a stand-alone application, and the functionality described herein may be implemented in one or more applications executing and residing on the mobile device.

At step 410, a call for a user of the mobile device ("incoming call") is received on a communication line accessible at the mobile device. The call may be received over a communication line specifically configured for voice communications, for data communications, or for both, depending on the implementation.

At step 420, the phone number associated with the incoming call is identified. The phone number may subsequently be displayed to the user (e.g. at step 440). It may also be used, for example, to determine the identity of the caller and to associate the incoming call with a contact entry in the user's address book (e.g. at steps 430 and 432).

At step 430, a determination is made as to whether a contact entry in the user's address book is associated with the incoming call. This may be performed by attempting to match the phone number identified at step 420 with a corresponding data item in a contact entry in the user's address book. If a match is found, then at step 432, further data items from the associated contact entry (e.g. individual name, company name, picture) may be retrieved for subsequent display (at step 440) in a caller identification data field of an incoming call screen. If no match is found, then the flow of method steps proceeds directly to step 440.

At step 440, an incoming call screen is displayed to the user on a display (e.g. display 110 of FIG. 1) of the mobile device. The incoming call screen informs the user that a call is being received at the mobile device, and presents the user with options for response. The incoming call screen is divided into a caller identification data field for displaying data associated with the incoming call, and at least one key label field in which labels can be displayed to inform the user of at least some actions that may be taken by the user by depressing certain keys provided on the mobile device. Further user interface features in respect of the incoming call screen that may be implemented in various embodiments are illustrated with reference to the example screenshots of FIGS. 6 through 8.

In use, when a call is first received at the mobile device, the user will typically look at the displayed incoming call screen to see who is calling. Accordingly, it may be preferable to have a substantial portion of the incoming call screen dedicated to providing the information that identifies the caller when the call is first received. The user will then need to decide what action should be taken with respect to the incoming call. It is expected that the user will often decide to simply answer or ignore the call by depressing the send or the end key without the need to consider alternative response options.

Accordingly, a comprehensive list of available options is not provided on the incoming call screen when a call is first received. This potentially allows the area of the caller identification data field to occupy a relatively large proportion of the display. The area of the at least one key label field can be kept relatively small (e.g. occupying about 10% of the display). This may allow, for example, a greater number of caller identification data items to be displayed, and/or greater flexibility in laying out caller identification data items within the caller identification data field so that they might be more easily read by the user.

At step 450, a selection of a mobile device key made by the user (e.g. the user has depressed the key) is detected. The selected key may be a send key (e.g. an "Answer" key), an end key (e.g. an "Ignore" key), a menu key, or some other pre-programmed key.

At step 460, it is determined whether the selection made at step 450 is to result in the display of an options menu. For example, if a menu key is pressed, an options menu will be displayed to the user.

In an example use, the user directs that an option menu be displayed when the user wishes to consider additional options for responding to the incoming call (e.g. "advanced options") other than the basic answer and ignore functions available by pressing the send or end keys. As a result, the information identifying the caller as displayed in the caller identification data field need not be obscured unless the user specifically wishes to consider the additional options.

The menu key may or may not be identified by an options menu identifier displayed in association with that menu key. Where the menu key is to be identified by an options menu identifier, the options menu identifier is displayed in a key label field in this embodiment.

On the other hand, if the send key or the end key is pressed, another action (e.g. answering the call, ignoring the call) will be performed without requiring the options menu to be displayed. Furthermore, where the user is already engaged in a different call when the incoming call is received, a default answering function (e.g. answer the incoming call and hold the other call) will be performed when the send key is pressed.

An options menu provides the user with options for responding to the call currently being received at the mobile device. For example, where the user is already engaged in a different call when the incoming call is received, the user may be provided with the following options: answer the incoming call and hold the other call, answer the incoming call and drop the other call, or ignore the incoming call and continue with the other call.

Other options and/or different options may be provided in variant embodiments. For example, an option may be provided to place the incoming call on hold, until the user makes a further selection to answer or drop the call. As a further example, an option may be provided to forward the incoming call to another telephone number (e.g. a landline telephone). As a further example, an option may be provided to redirect audio output to a specified device (e.g. a wireless headset, a remote speaker).

If it is determined at step 460 that the selection requires an option menu to be displayed, the option menu is displayed at step 462, and a selection of an option by the user is detected at step 464. Otherwise, the flow of method steps proceeds directly to step 470.

At step 470, the incoming call is processed according to the selection of the mobile device key by the user as detected at step 450, or the selection of an option from the options menu by the user as detected at step 464, depending on the determination made at step 460. For example, the incoming call may be answered or ignored at this step, in known manner. If the incoming call has been received while the user is engaged in a different call, the different call may be put on hold or dropped at this step for example, in known manner.

If the user engages in the incoming call by answering the call, the call will continue until it is terminated (e.g. by the user or by the caller) at step 480.

A further call may be received at the mobile device while the user is already engaged in a call if, for example, the mobile device is configured to provide "call waiting" functionality. In this manner, a further iteration of method 400 may be performed before the previous iteration has terminated. In that case, the steps of a new instance of method 400 may be concurrently performed as shown by the dotted arrow in FIG. 5.

Figure 6:
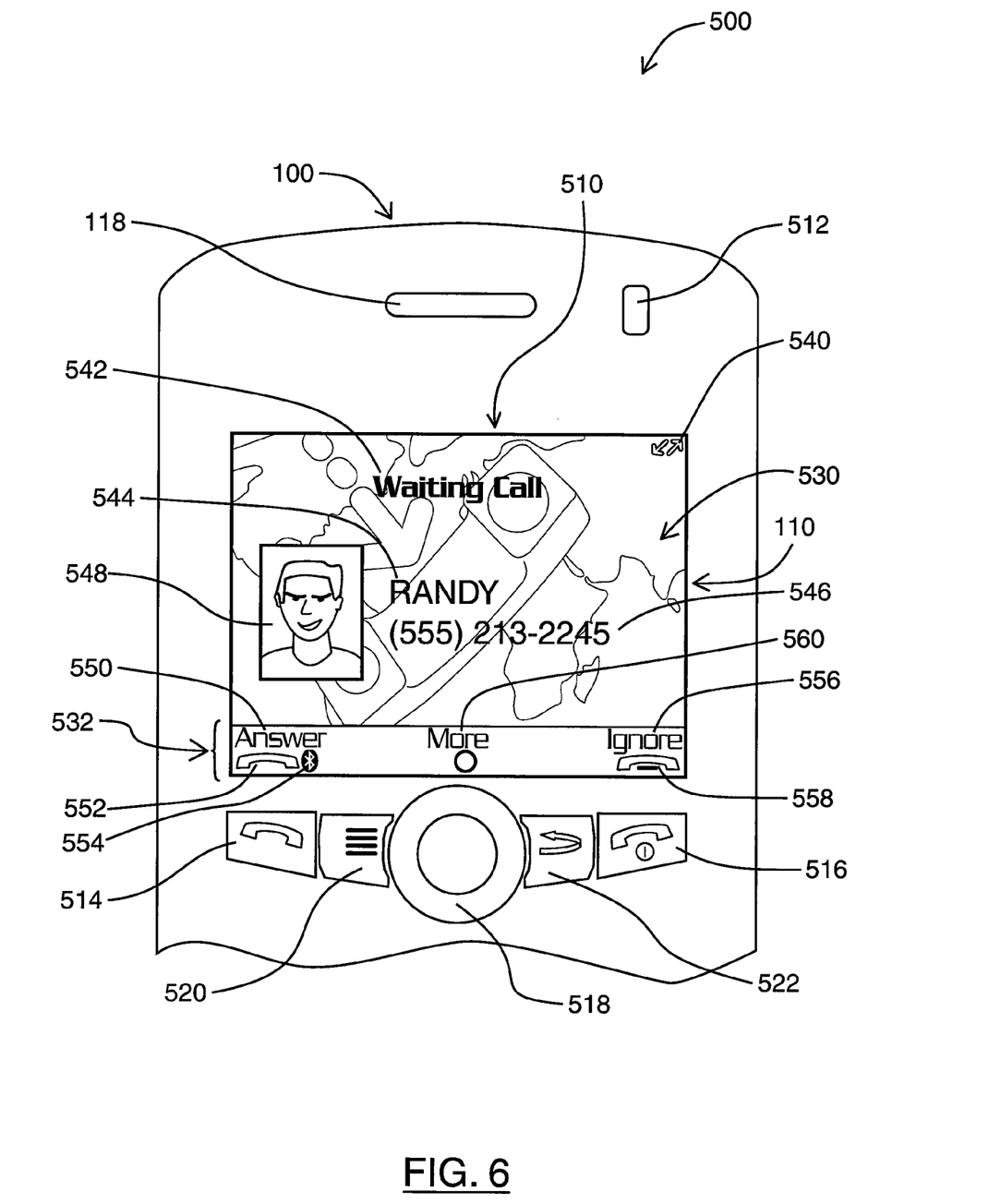
FIG. 6 is an example of a screenshot of a user interface provided to a user in accordance with an example implementation of one embodiment.

Referring now to FIG. 6, a screenshot of a user interface provided to a user in accordance with an example implementation of one embodiment is shown generally as 500.

In FIG. 6, screenshot 500 illustrates a user interface displayed in a display 110 of a mobile device 100, namely for an incoming call screen 510 used to inform the user of calls being received at mobile device 100. Mobile device 100 provides an integrated speaker 118, a visual alert indicator 512, a send key 514, an end key 516 (end key 516 is also used as a power-on key in this example implementation), a track ball 518, a menu key 520, and an escape key 522.

While send key 514, end key 516, menu key 520 and escape key 522 are shown as physical keys provided on the mobile device in this example, it will be understood by persons skilled in the art that some mobile devices may provide one or more of these keys as virtual keys on a touch-sensitive screen.

Incoming call screen 510 is divided into a caller identification data field 530 and a key label field 532. In this example, the combined areas of caller identification data field 530 and key label field 532 occupy the entire area of display 110. Moreover, the area of caller identification data field 530 is much greater than the area of key label field 532, allowing for greater flexibility in the layout of caller identification data and potentially making displayed caller identification data easier to read. In this example, key label field 532 is illustrated as one contiguous field, although more than one separate key label field may be displayed on incoming call screen 510 in variant embodiments.

In this example, the following items are displayed in caller identification data field 530:
- a background image is shown within caller identification data field 530;
- a data transmission indicator 540 in the upper-right hand corner of display 110;
- a "waiting call" indicator 542 centrally justified (horizontally) near the top of display 110, indicating that the incoming call is awaiting user consideration while the user is engaged in a different call;
- the name of the caller 544 associated with the current incoming call, the phone number 546 associated with the current incoming call, and a picture 548 associated with the caller, shown substantially centered (vertically) in the display 110.

In this example, key label field 532 is confined to a narrow section of display 110, at an end of display 110 nearest the send key 514 and end key 516 provided by mobile device 100. A first label is displayed in an area on display 110 within key label field 532 close to and above send key 514. The first label comprises a text identifier "Answer" 550 and an answer icon 552. In this example, a Bluetooth™ headset has been activated for use, and accordingly, a wireless audio device icon (e.g. a Bluetooth™ symbol) 554 is also shown with the first label. A second label is displayed in an area on display 110 within key label field 532 close to and above end key 516. The second label comprises a text identifier "Ignore" 556 and an ignore icon 558. An options menu identifier 560 is also displayed within key label field 532. In this example, options menu identifier 560 is displayed in an area close to and above track ball 518, and includes a white circle to suggest that the track ball 518 can be depressed to direct that an options menu be displayed. However, a direction to display to the options menu may be provided by depressing a different key (e.g. menu key 520) depending on the implementation. The options menu may also be displayed after a user depresses a key such as the menu key 520 even if an options menu identifier 560 has not been displayed within key label field 532.

Figure 7A:
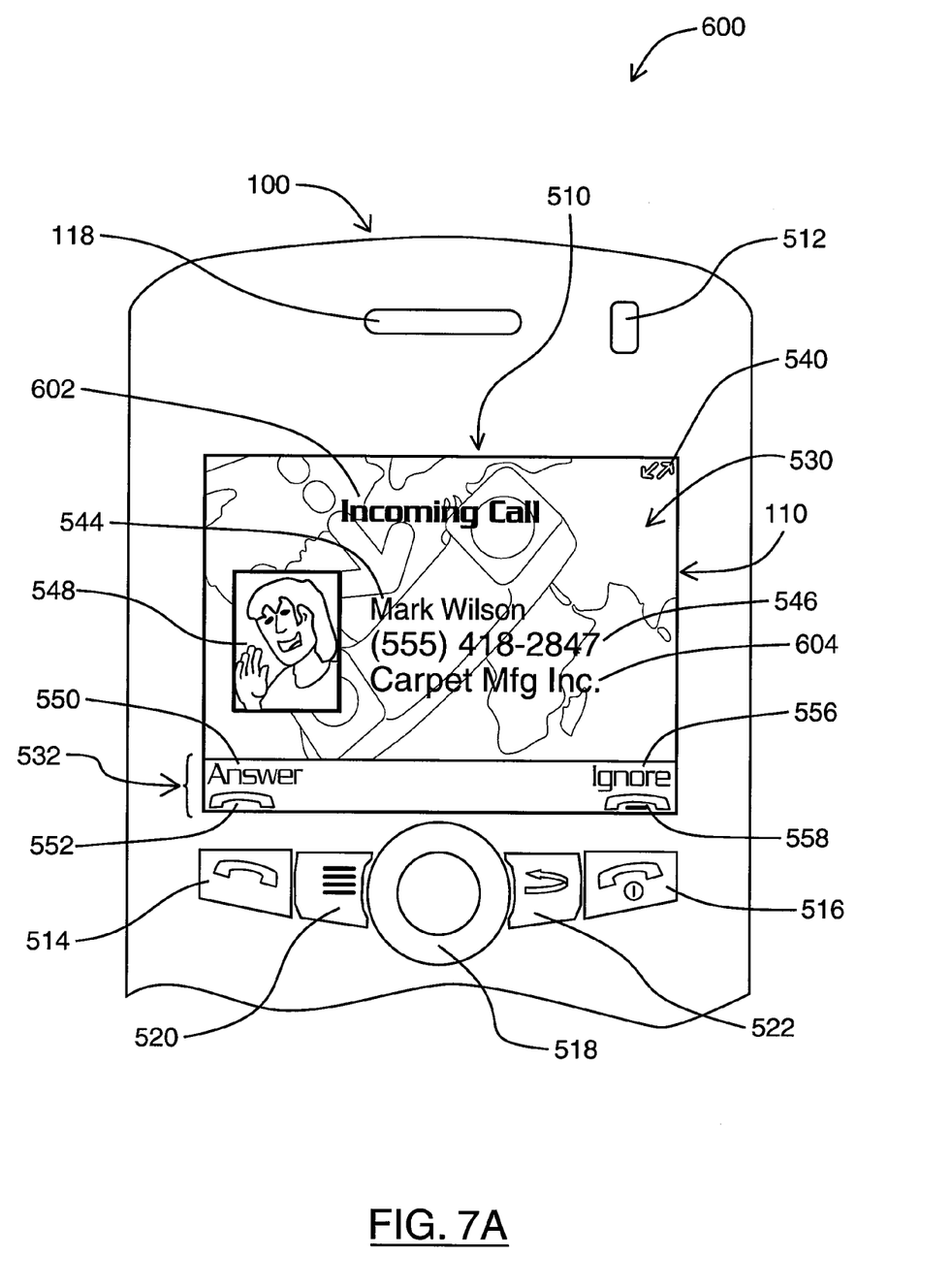
FIG. 7A is an example of a screenshot of a user interface provided to a user in accordance with an example implementation of another embodiment.

Referring now to FIG. 7A, a screenshot of a user interface provided to a user in accordance with an example implementation of another embodiment is shown generally as 600.

Screenshot 600 illustrates a number of similar elements as shown in FIG. 6. Similar reference numerals are used to refer to similar elements, and reference may be made to the description in respect of screenshot 500 of FIG. 6 for further details on those elements that also appear in screenshot 600.

In FIG. 7A, an "incoming call" indicator 602 is displayed, shown centrally justified (horizontally) near the top of display 110 in this example, indicating that a call is being received at mobile device 100. In this embodiment, options menu identifier 560 (FIG. 6) is not shown, as the user is not currently engaged in a different call. However, as noted earlier, an option menu may still be accessible (e.g. by pressing menu key 520) even if options menu identifier 560 is not shown. It will also be understood that an options menu identifier may be shown even if the user is not currently engaged in a different call.

A company name 604, along with name of the caller 544, phone number 546, and picture 548 is displayed in caller identification data field 530. After identifying phone number 546 when the call is received, a contact entry associated with the incoming call is determined by matching phone number 546 to a corresponding data item in a contact entry stored on the mobile device. Once the contact entry associated with the incoming call is determined, data items in the contact entry such as name of the caller 544, picture 548, and/or company name 604 can be retrieved for display on the caller identification data field 530 of incoming call screen 510.

Figure 7B:
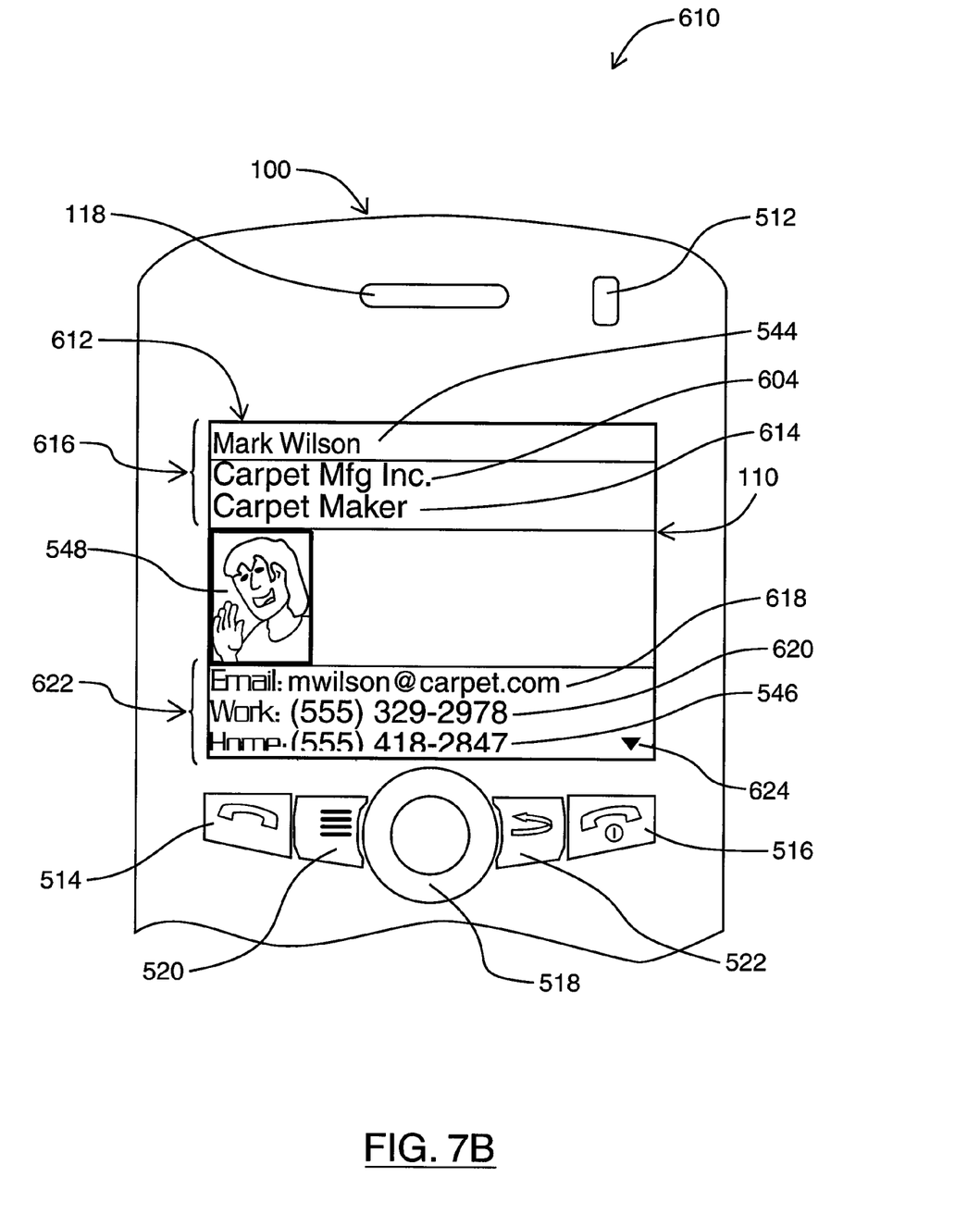
FIG. 7B is an example of a screenshot of a user interface that displays data used to populate the user interface of FIG. 7A.

To further illustrate the foregoing features, reference is made to FIG. 7B showing a screenshot 610 in display 110, where the user has directed the associated contact entry 612 to be displayed. FIG. 7B is an example of a screenshot of a user interface that displays contact entry data used to populate the user interface of FIG. 7A.

Contact entry 612 comprises a contact name 544, a company name 604, and a title 614 within a primary contact details field 616. Contact entry 612 further comprises one or more pictures 548 associated with the contact. Contact entry 612 further comprises an e-mail address 618, and a second "Work" phone number 620 in addition to "Home" phone number 546, within one or more contact details fields 622. Although not shown in FIG. 7A, an identification of the caller's line (e.g. "Work", "Home") can also be determined for display in caller identification data field 530.

Further phone numbers or other contact details may be provided within contact details field 622. The existence of additional contact details is indicated in this example by icon 624.

As previously noted, when a phone number for an incoming call is identified, it can be matched to a phone number in the contact details field 622 of contact entries stored on mobile device 100 to determine the associated contact entry (if one exists). Data from the associated contact entry can then be retrieved for display.

Figure 8:
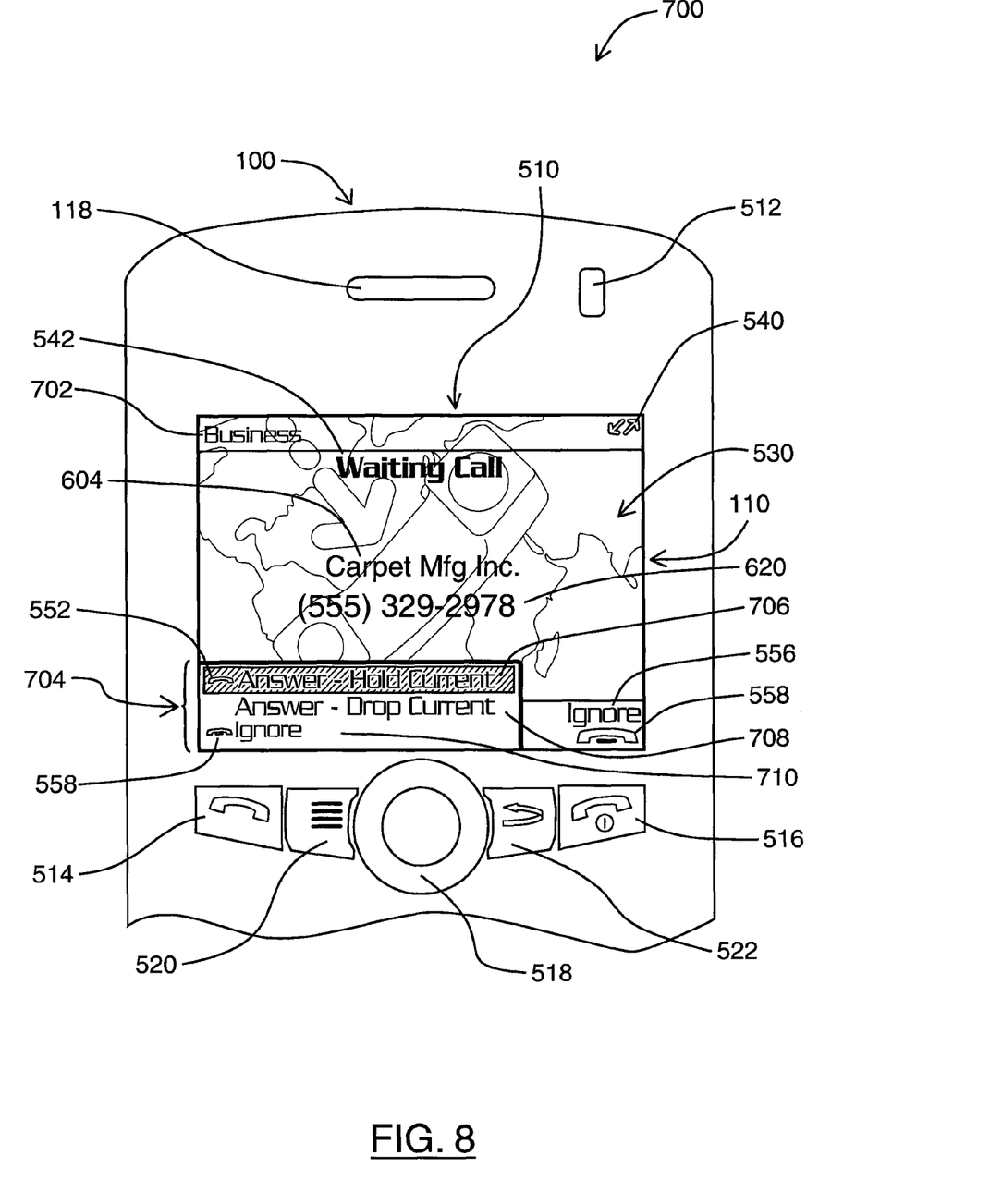
FIG. 8 is an example of a screenshot of a user interface provided to a user in accordance with an example implementation of another embodiment.

Referring now to FIG. 8, a screenshot of a user interface provided to a user in accordance with an example implementation of another embodiment is shown generally as 700.

Screenshot 700 illustrates a number of similar elements as shown in FIGS. 6, 7A and 7B. Similar reference numerals are used to refer to similar elements, and reference may be made to the description in respect of the corresponding screenshots of FIGS. 6, 7A and 7B for further details on those elements that also appear in screenshot 700.

In this example, mobile device 100 provides access to multiple communication lines. Communication line identifier 702 is displayed to indicate that the incoming call is being received on the user's "Business" line. The "waiting call" indicator 542 also indicates that a call is being received while the user is already engaged in a different call.

In this example, an options menu 704 is displayed. Options menu 704 may be displayed in response to the user pressing menu key 520 or track ball 518 for example, prompting the user for further direction on how to handle the incoming call and the other call that the user is engaged in. Through options menu 704, the user is provided with a first option 706 to answer the incoming call and hold the other call, a second option 708 to answer the incoming call and drop the other call, and a third option 710 to ignore the incoming call and continue with the other call. An answer icon 552 and ignore icon 558 can also be displayed in association with the options provided in options menu 704 to suggest that the user can also select the corresponding option 706 or 710 by pressing send key 514 or end key 516 respectively. Other options not shown in this example may be provided in options menu 704.

It will be understood by persons skilled in the art that the features of the user interfaces illustrated with reference to the example screenshots described herein are provided by way of example only. It will be understood by persons skilled in the art that variations are possible in variant implementations and embodiments.

It is noted that although some of the features of embodiments described herein may have been illustrated in combination in the examples of FIGS. 6 through 8 for ease of exposition, this is not to suggest that such features may only exist in such combinations. It will be understood by persons skilled in the art that certain features can be implemented independently of other features, and in different combinations in variant embodiments.

The steps of a method of providing a user interface for managing calls received at a mobile device in accordance with any of the embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of providing a user interface for managing calls received at a mobile device, the mobile device providing access to at least a first communication line configured to receive the calls, the mobile device providing send and end keys, the method comprising:
   identifying a phone number associated with an incoming call being received at the mobile device; and
   displaying an incoming call screen on a display of the mobile device, the incoming call screen comprising (i) a caller identification data field for displaying data associated with incoming calls and (ii) at least one key label field in which first and second labels for the send key and end key respectively are displayed;
   wherein the area of the caller identification data field is greater than the area of the at least one key label field;
   wherein an options menu comprising user-selectable options for responding to the incoming call is displayed on the incoming call screen if a direction to display the options menu is received at the mobile device after the incoming call is first received at the mobile device; and
   wherein a third label is displayed in the at least one key label field at the displaying if the incoming call is received at the mobile device while the mobile device is engaged in a different call but the third label is not displayed at the displaying if the incoming call is received at the mobile device while the mobile device is not engaged in the different call, the third label comprising an options menu identifier associated with the options menu.

2. The method of claim 1, wherein the area of the caller identification data field and the area of the at least one key label field, in combination, occupies the entire visible area on the display of the mobile device.

3. The method of claim 1, wherein the at least one key label field occupies 10% of the area of the display.

4. The method of claim 1, wherein at the displaying, the at least one key label field is displayed proximate the send and end keys, such that the first label is displayed in an area of the display adjacent to the send key, and the second label is displayed in an area of the display adjacent to the end key.

5. The method of claim 1, wherein the first label comprises an answer icon and a corresponding text identifier, and wherein the second label comprises an ignore icon and a corresponding text identifier.

6. The method of claim 1, wherein the first label comprises a wireless audio device icon.

7. The method of claim 1, further comprising:
   detecting when one of the send and end keys are user-selected, and processing the incoming call in accordance with the user-selected key.

8. The method of claim 1, further comprising:
   detecting when the direction to display the options menu is received, displaying the options menu in the user interface, detecting when an option from the options menu is user-selected, and processing the incoming call in accordance with the user-selected option.

9. The method of claim 1, wherein at least one item of data associated with the incoming call is displayed in an area of the caller identification data field that is centered along at least one axis of the display.

10. The method of claim 1, further comprising:
    determining a contact entry associated with the incoming call on the mobile device by matching the phone number associated with the incoming call to a data item in the contact entry, and displaying at least one item from the contact entry in the caller identification data field.

11. The method of claim 10, wherein the at least one item from the contact entry displayed in the caller identification data field comprises a company name.

12. The method of claim 10, wherein the contact entry associated with the incoming call is stored in an address book on the mobile device.

13. The method of claim 1, wherein the mobile device provides access to a plurality of communication lines configured to receive calls, and wherein data identifying the communication line on which the incoming call is received is displayed in the caller identification data field.

14. A non-transitory computer-readable medium comprising instructions executable on a processor of the mobile device for implementing a method of providing a user interface for managing calls received at a mobile device, the mobile device providing access to at least a first communication line configured to receive the calls, the mobile device providing send and end keys, the method comprising:
    identifying a phone number associated with an incoming call being received at the mobile device; and
    displaying an incoming call screen on a display of the mobile device, the incoming call screen comprising (i) a caller identification data field for displaying data associated with incoming calls and (ii) at least one key label field in which first and second labels for the send key and end key respectively are displayed;
    wherein the area of the caller identification data field is greater than the area of the at least one key label field;
    wherein an options menu comprising user-selectable options for responding to the incoming call is displayed on the incoming call screen if a direction to display the options menu is received at the mobile device after the incoming call is first received at the mobile device; and
    wherein a third label is displayed in the at least one key label field at the displaying if the incoming call is received at the mobile device while the mobile device is engaged in a different call but the third label is not displayed at the displaying if the incoming call is received at the mobile device while the mobile device is not engaged in the different call, the third label comprising an options menu identifier associated with the options menu.

15. A system for providing a user interface for managing calls received at a mobile device, the mobile device providing access to at least a first communication line configured to receive the calls, the mobile device providing send and end keys, the mobile device comprising a processor, a display, and at least one input device, wherein the processor is configured to:
- identify a phone number associated with an incoming call being received at the mobile device; and
- display an incoming call screen on a display of the mobile device, the incoming call screen comprising (i) a caller identification data field for displaying data associated with incoming calls and (ii) at least one key label field in which first and second labels for the send key and end key respectively are displayed;
- wherein the area of the caller identification data field is greater than the area of the at least one key label field;
- wherein an options menu comprising user-selectable options for responding to the incoming call is displayed on the incoming call screen if a direction to display the options menu is received at the mobile device after the incoming call is first received at the mobile device; and
- wherein a third label is displayed in the at least one key label field if the incoming call is received at the mobile device while the mobile device is engaged in a different call but the third label is not displayed if the incoming call is received at the mobile device while the mobile device is not engaged in the different call, the third label comprising an options menu identifier associated with the options menu.

16. The system of claim 15, wherein the processor is configured to display the at least one key label field proximate the send and end keys, such that the first label is displayed in an area of the display adjacent to the send key, and the second label is displayed in an area of the display adjacent to the end key.

17. The system of claim 15, wherein the first label comprises an answer icon and a corresponding text identifier, and wherein the second label comprises an ignore icon and a corresponding text identifier.

18. A mobile device on which a user interface for managing calls received at the mobile device is provided, the mobile device providing access to at least a first communication line configured to receive the calls, the mobile device providing send and end keys, the mobile device comprising a processor, a display, and at least one input device, wherein the mobile device is configured to:
- identify a phone number associated with an incoming call being received at the mobile device; and
- display an incoming call screen on a display of the mobile device, the incoming call screen comprising (i) a caller identification data field for displaying data associated with incoming calls and (ii) at least one key label field in which first and second labels for the send key and end key respectively are displayed;
- wherein the area of the caller identification data field is greater than the area of the at least one key label field;
- wherein an options menu comprising user-selectable options for responding to the incoming call is displayed on the incoming call screen if a direction to display the options menu is received at the mobile device after the incoming call is first received at the mobile device; and
- wherein a third label is displayed in the at least one key label field if the incoming call is received at the mobile device while the mobile device is engaged in a different call but the third label is not displayed if the incoming call is received at the mobile device while the mobile device is not engaged in the different call, the third label comprising an options menu identifier associated with the options menu.

19. The device of claim 18, further configured to display the at least one key label field proximate the send and end keys, such that the first label is displayed in an area of the display adjacent to the send key, and the second label is displayed in an area of the display adjacent to the end key.

20. The device of claim 18, wherein the first label comprises an answer icon and a corresponding text identifier, and wherein the second label comprises an ignore icon and a corresponding text identifier.

* * * * *